Sept. 20, 1966     D. L. BOYES     3,274,477

STORAGE BATTERY

Filed July 31, 1963     4 Sheets-Sheet 2

INVENTOR.
Donald L. Boyes
BY
*John T. Manvin*
His Attorney

INVENTOR.
Donald L. Boyes
BY
His Attorney

INVENTOR.
Donald L. Boyes
BY
His Attorney

United States Patent Office 3,274,477
Patented Sept. 20, 1966

3,274,477
STORAGE BATTERY
Donald L. Boyes, Anderson, Ind., assignor to General Motors Corporation, Detroit, Mich., a corporation of Delaware
Filed July 31, 1963, Ser. No. 299,041
5 Claims. (Cl. 320—35)

This invention relates to batteries and is more particularly concerned with batteries including built-in regulators for varying the charging rate thereof in accordance with ambient conditions within the battery case.

It is therefore the prime object of the invention to provide a storage battery with a built-in control which is sensitive to ambient temperature conditions and which varies the charging rate of the battery in accordance with battery temperature conditions.

This object is accomplished by building the voltage regulator into the battery case so that all parts of the regulator are subjected to battery temperature and to include a resistance or other suitable means in the regulator that is sensitive to battery temperatures for controlling the charging rate of the battery.

In this manner when the temperature of the battery increases, the control means will cause the voltage regulator to reduce the generator voltage or conversely when the battery temperature decreases, the voltage rgulator will function to increase the same whereby the battery will be properly charged in either hot or cold weather, and under all other conditions of temperature to which the battery is subjected.

It is a well known fact that the voltage input to a storage battery for charging purposes should be varied in accordance with the temperature of the battery. To this end voltage regulators either of the vibratory contact type or of the solid state type have been provided with temperature compensating devices whereby the generator voltage, and as a consequence thereof, the charging rate to the battery is varied to attain improved charging conditions. This control is difficult to obtain, however, since the voltage regulator, in the past, has been placed at a point remote from the battery and the variations in temperature at the regulator do not reflect the true temperature of the battery but rather of the compartments or areas surrounding the regulator.

In Patent 2,421,523 assigned to the assignee of the present invention, a system is shown wherein a vibratory regulator positioned remote from the battery has its action modified by a resistor in circuit with the actuator coil of the regulator which resistor is located in the battery case. In this instance, the regulator is more sensitive to battery temperature, however, it is also a known fact that other components of the regulator whether it be a vibratory contact type or a solid state regulator, are affected by temperature and the entire resistance of the regulator circuit should therefore be in a position where it will be affected by the battery temperature if the best control is to be obtained. Furthermore, systems such as are shown in the aforementioned patent frequently become ineffective due to breakage of the wire connecting the compensator with the regulator, corrosion of the wire, etc.

In the present invention, the resistor or other means used for changing the output of the generator is built into the regulator and the entire assembly is positioned in or on the battery in direct contact therewith and various connections are included within the battery whereby chances of corrosion or damage to the connections are vastly decreased. I have found that this combination properly responds to battery temperatures and accurately controls the charging rate whereby the battery and the regulator are operated under optimum conditions at all times to lessen difficulties heretofore apparent in battery charging controls.

In Patent 2,751,549, a regulating system is shown where the load may be a battery and wherein a temperature compensating resistor is included in the circuit. This patent deals with a solid state regulating system but it is apparent that if this device were mounted in direct and operative contact with the battery that the temperature compensating resistance being subjected to battery temperature would control the charging system to produce optimum results. Thus, whether the control used on the charging system is either of the mechanical or solid state type, improved performance of the units in accordance with battery temperature is obtained by following the teachings herein. It is further understood that whether the generator is A.C. or D.C., the same control factors are required, since when an A.C. generator is used, the current is rectified for battery charging purposes. This type of system is becoming increasingly important in the automotive industry but the same problems exist in connection with the battery charging and the same controls are required.

Further objects and advantages of the present invention will be apparent from the following description, reference being had to the accompanying drawings wherein preferred embodiments of the present invention are clearly shown.

Figure 1:
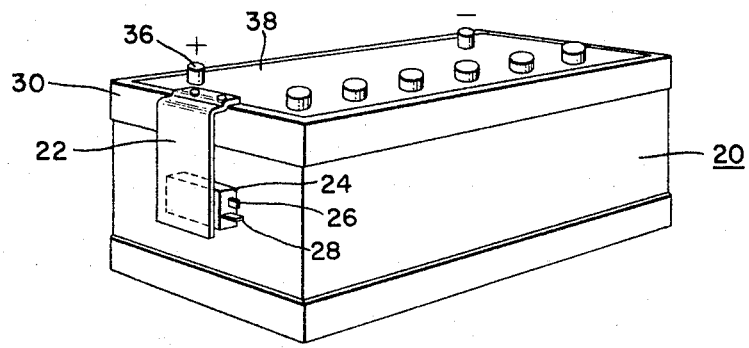
FIGURE 1 illustrates a storage battery in perspective.
Figure 2:
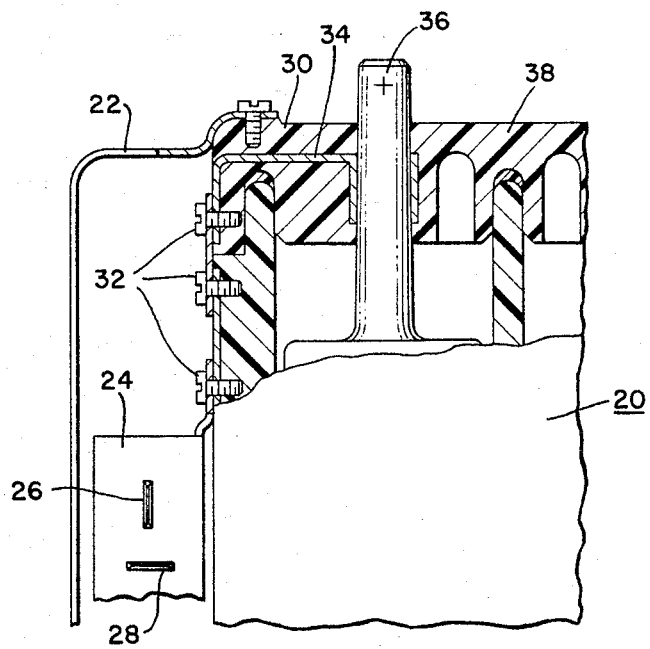
FIGURE 2 is a fragmentary enlarged sectional view of one end of the battery showing the regulator associated with the battery and showing internal electrical connections which are formed to accommodate the regulator.
Figure 3:
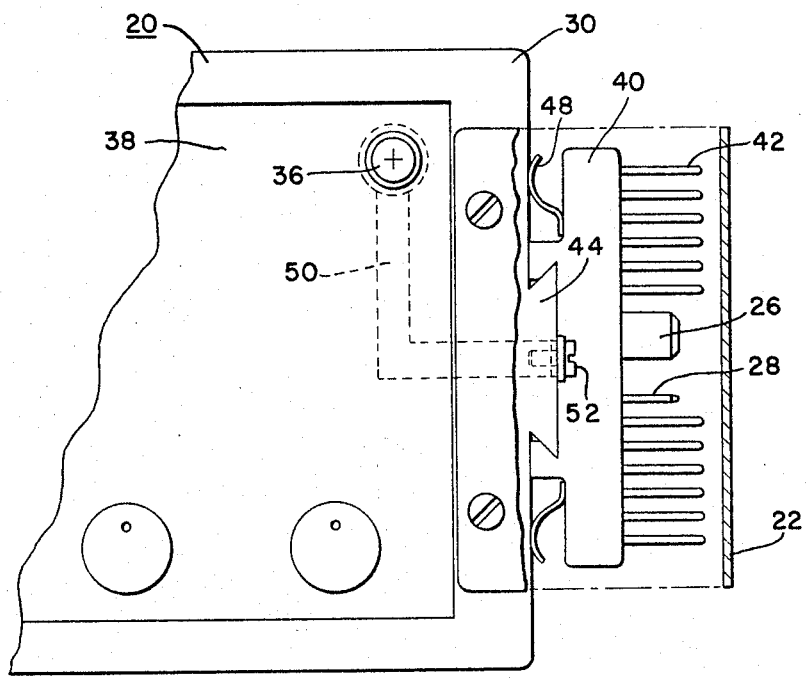
FIGURE 3 is a top view partially cut away showing means by which the regulator may be attached to the battery so that temperature conditions may be sensed thereby.
Figure 4:
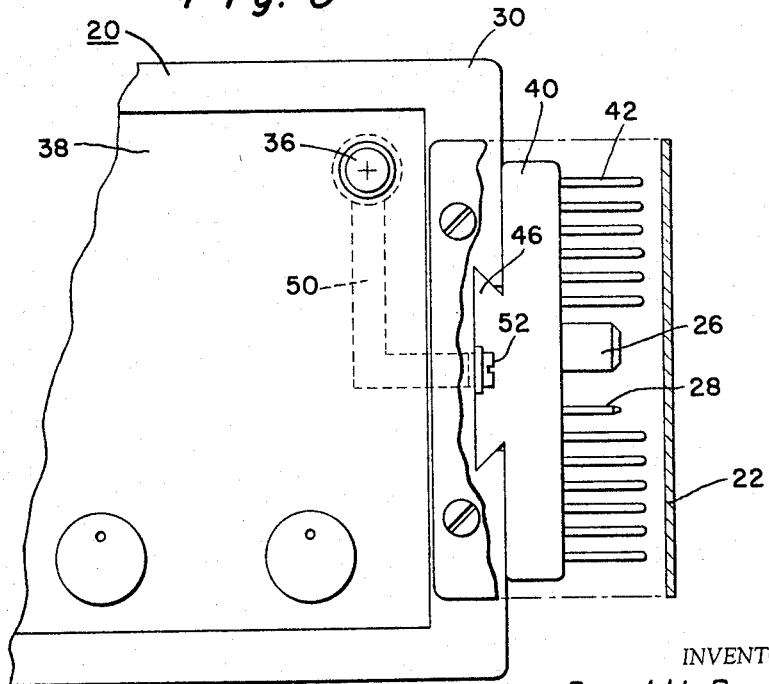
FIGURE 4 is a view similar to FIGURE 3 showing another attachment means for sensing temperature conditions.

The structure shown in the drawings illustrate various types of regulators both mechanical and solid state. It is understood that in all cases either type of regulator may be used. It is generally desirable to mount the solid state regulators externally of the battery as shown in FIGURES 1, 3, and 4 so that the heat sinks normally provided will maintain the temperature of the semiconductors within the desired operating ranges. In these cases, however, the temperature of the battery will modify the action of the regulator irrespective of the heat sink.

Referring to FIGURE 1, a battery 20 is shown having a plurality of cells therein. At the left hand side of the battery 20 a removable cover plate 22 is used to shield a voltage regulator 24. The regulator 24 includes a pair of blade type terminals 26 and 28 which are polarized to assure proper connection. The regulator 24 is attached to a battery case 30 by screws 32 so as to be in direct heat conducting relation thereto. The screws 32 also act as electrical connections to an internal strap 34 which connects to the positive battery terminal 36. The strap 34 may be molded into the battery case cover 38 and be tapered to form a tight low resistance connection with the post 36. The strap 34 has little tendency to corrode in this position which eliminates another prevalent problem in present day assemblies whereby no resistance change occurs in the electrical connection to the voltage regulator.

The terminals 26 and 28 may be connected by leads to the generator and connected in conventional manner to complete the circuitry.

FIGURES 3 and 4 show modification of the structure as often required when solid state regulators 40 are used. These regulators 40 usually require a radiator or heat sink 42 for maintaining the internal components under desired temperature conditions. The regulator 40, in this case, is dovetailed as at 44 or 46 in FIGURES 3 and 4 respectively to form a heat conductive assembly with the battery case 30. Spring means 48 may be provided to aid in holding the assembly in tight relation if desired.

The electrical connection to the battery is again internal and is shown at 50 and is accomplished with a single screw 52. Polarized blade connections 26 and 28 are again provided for external connections.

Figure 5:
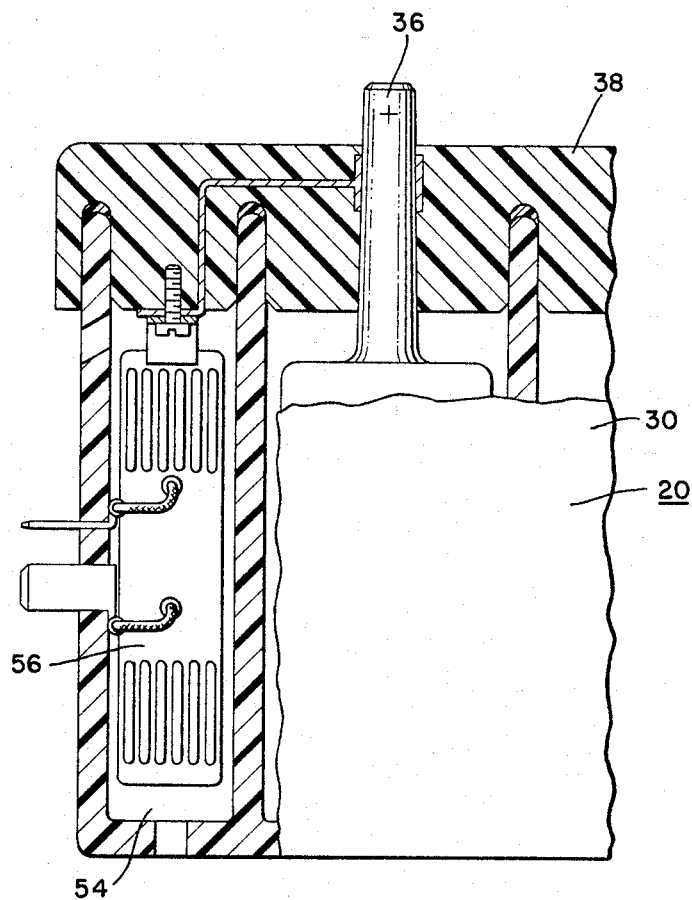
FIGURE 5 shows a regulator built into a special compartment within the battery wherein certain of the connections are also built into the battery and wherein a plug-in type connection may be made with the regulator with respect to certain of the circuits.

FIGURE 5 shows another modification where an additional compartment 56 is provided in the battery case. The regulator 54 is enclosed in the compartment and internal connections are made through a removable side cover (not shown) which may be subsequently sealed to the case.

Figure 6:
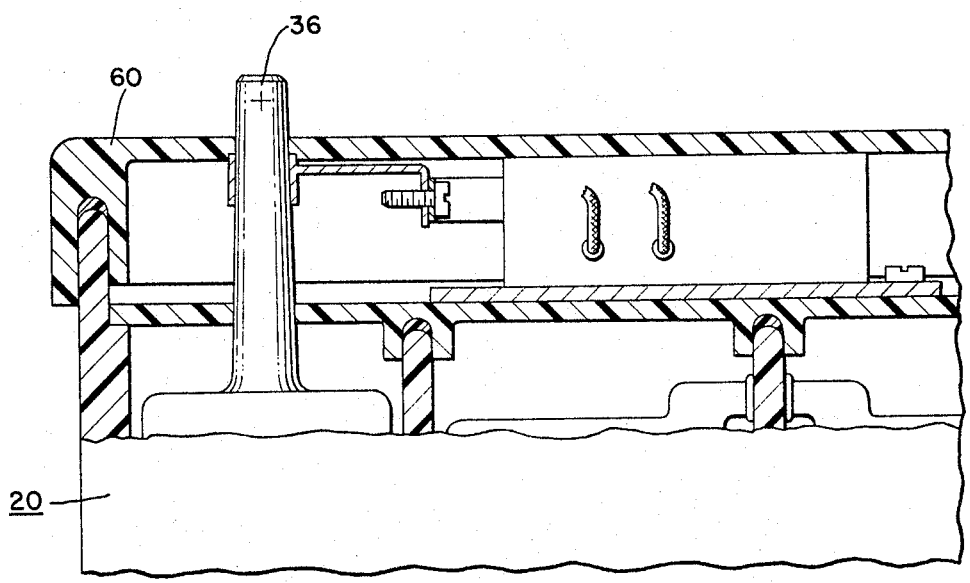
FIGURE 6 shows another means for mounting the regulator in the battery case. In this instance a cover is utilized in connection with longer terminal studs
Figure 7:
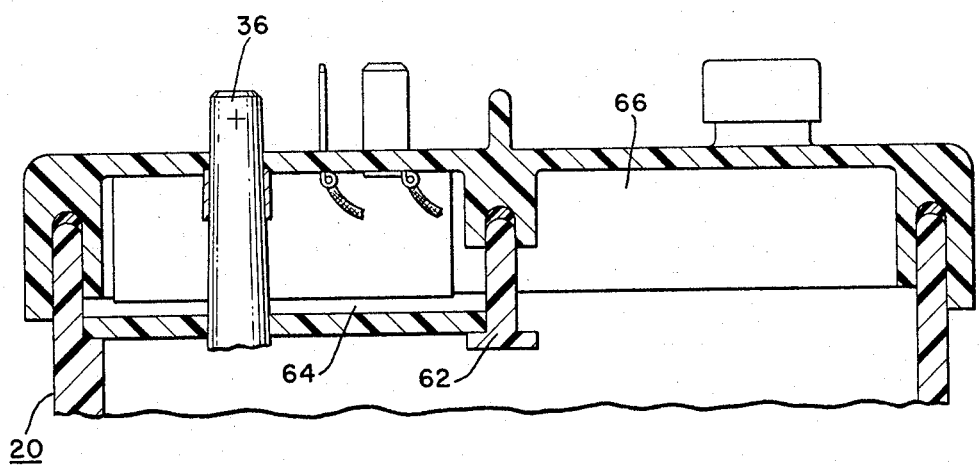
FIGURE 7 shows still another type of construction wherein the cells have their domed portions on one side of the battery and wherein a cavity is provided at the other side of the top of the battery for the voltage regulator.

FIGURES 6 and 7 show two more modifications in construction. In FIGURE 6, the battery case is covered by a compartment forming cover 60 which encloses the regulator and all connections.

FIGURE 7 shows a special case 62 wherein an end compartment 64 is formed along one side of the case and wherein the cell compartments 66 extend upwardly thereof.

In all embodiments, the regulator is maintained in direct heat conducting relation with the battery case so as to be sensitive to changes in battery temperature. In all cases, the regulator includes a resistor or other temperature sensitive circuit element which will vary the output of the generator in accordance with the temperature sensed at the battery whereby more accurate control of battery charging rates may be obtained.

If desired, additional temperature compensating devices may be used as shown in Patent No. 2,377,265, but in most instances the control of the circuit resistance in accordance with temperature is more satisfactory.

In general, my invention is directed to the accurate control of battery charging in direct response to battery temperature. The control may be affected, as noted, by means of a resistor in the voltage regulator circuit, or through the use of a thermistor or semiconductor sensitive to temperature conditions may be used. In all cases, however, the sensing and control device is in direct contact with the battery.

The second improvement effected by my invention is directed to the use of internal electrical connections preferably molded into the battery case. This eliminates the usual corrosion problems and effects better electrical connections and with more ease.

While the embodiments of the present invention as herein disclosed, constitutes preferred forms, it is to be understood that other forms might be adopted.

I claim:

1. The combination comprising a storage battery including a case and positive and negative battery terminals, a voltage regulator mounted in direct and intimate heat exchange contact with said storage battery and including a circuit controlling element, internal electrical connecting means molded directly into said case for connecting one terminal of said storage battery to said voltage regulator, said circuit controlling element being sensitive to changes in temperature of said battery whereby said voltage regulator controls the charging rate to said battery from a charging device remote therefrom to maintain the charging rate at the optimum value with respect to the temperature for charging said battery.

2. The combination of claim 1 in which the storage battery case has a compartment in which the voltage regulator is mounted.

3. The combination of claim 2 in which the voltage regulator is of the vibratory contact type.

4. The combination of claim 2 in which the voltage regulator is a solid state regulator.

5. The combination of claim 2 in which the circuit controlling element is a resistor.

References Cited by the Examiner

UNITED STATES PATENTS

| | | | |
|---|---|---|---|
| 976,747 | 11/1910 | Schmidt | 320—36 |
| 1,200,994 | 10/1916 | Shindel | 136—135 X |
| 1,457,863 | 6/1923 | Strawmyer et al. | 320—36 |
| 1,903,448 | 4/1933 | Furtney | 136—135 X |
| 2,802,980 | 8/1957 | Lapuyade | 320—36 |
| 3,193,751 | 7/1965 | Cadiou | 320—35 |
| 3,241,028 | 3/1966 | Mas | 320—35 X |

JOHN F. COUCH, *Primary Examiner.*

LLOYD McCOLLUM, *Examiner.*

S. WEINBERG, *Assistant Examiner.*